United States Patent
Accapadi et al.

(10) Patent No.: US 7,120,753 B2
(45) Date of Patent: Oct. 10, 2006

(54) SYSTEM AND METHOD FOR DYNAMICALLY ADJUSTING READ AHEAD VALUES BASED UPON MEMORY USAGE

(75) Inventors: Jos Manuel Accapadi, Austin, TX (US); Andrew Dunshea, Austin, TX (US); Li Li, Austin, TX (US); Grover Herbert Neuman, Austin, TX (US); Mysore Sathyanarayana Srinivas, Austin, TX (US); David Alan Hepkin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 10/828,455

(22) Filed: Apr. 20, 2004

(65) Prior Publication Data
US 2005/0235125 A1    Oct. 20, 2005

(51) Int. Cl.
*G06F 12/00* (2006.01)
*G06F 9/38* (2006.01)

(52) U.S. Cl. .............. 711/137; 711/170; 711/204; 711/205; 711/213

(58) Field of Classification Search .......... 711/137, 711/170, 204, 205, 213
See application file for complete search history.

(56) References Cited

U.S. PATENT DOCUMENTS

| | | | |
|---|---|---|---|
| 5,606,685 A * | 2/1997 | Frandeen ................. | 711/117 |
| RE36,462 E * | 12/1999 | Chang et al. ............. | 711/209 |
| 6,327,642 B1 * | 12/2001 | Lee et al. ................. | 711/120 |
| 6,408,313 B1 * | 6/2002 | Campbell et al. ......... | 707/205 |
| 7,017,025 B1 * | 3/2006 | Kissell .................... | 711/206 |
| 2002/0091895 A1 * | 7/2002 | Haines et al. ............. | 711/112 |
| 2003/0105940 A1 * | 6/2003 | Cooksey et al. .......... | 711/203 |
| 2004/0080512 A1 * | 4/2004 | McCormack et al. ....... | 345/543 |
| 2004/0268124 A1 * | 12/2004 | Narayanan ................. | 713/164 |

OTHER PUBLICATIONS

"Evaluating Advanced Time Sharing Systems," IBM TDB, Oct. 1971, p. 1462-65.
"Redirector Multimedia Streaming Using Asynchronous Read Ahead," IBM TDB, May 1994, p. 65-68.
"Performance Overview of Management of Fixed Disk Storage," AIX Ver. 3.2 and 4 Performance Tuning Guide, http://nscp.upen.edu/aix4.3html/aixbman/prftungd/fdiskman.htm, 5pages.
"Tuning with vmtune," Performance Management Guide, http://publibn.boulder.ibm.com/doc_link/enUS/a_doc_lib/aixbman/prftungd/2365c89.htm, 6 pages.
"Performance Overview of the Virtual Memory Manager (VMM)," Performance Management Guide, http://publibn.boulder.ibm.com/pseries/en_US/aixbman/prftungd/2365c22.htm, 9 pages.
"Virtual Memory Manager (VMM) Overview," System Management Concepts: Operating System and Devices, http://publib16.boulder.ibm.com/pseries/en_US/aixbman/admnconc/vmm_overview.htm, 2 pages.

* cited by examiner

*Primary Examiner*—Matthew Kim
*Assistant Examiner*—Lev Iwashko
(74) *Attorney, Agent, or Firm*—VanLeeuwen & VanLeeuwen; Marilyn S. Dawkins

(57) ABSTRACT

A system and method for dynamically altering a Virtual Memory Manager (VMM) Sequential-Access Read Ahead settings based upon current system memory conditions is provided. Normal VMM operations are performed using the Sequential-Access Read Ahead values set by the user. When low memory is detected, the system either turns off Sequential-Access Read Ahead operations or decreases the maximum page ahead (maxpgahead) value based upon whether the amount of free space is simply low or has reached a critically low level. The altered VMM Sequential-Access Read Ahead state remains in effect until enough free space is available so that normal VMM Sequential-Access Read Ahead operations can be performed (at which point the altered Sequential-Access Read Ahead values are reset to their original levels).

30 Claims, 5 Drawing Sheets

Figure 4

Assume:
- MinFreeSpace = 100
- Threshold = 90
- MaxPageAhead = 64

400

| Free Space | MaxPageAhead | CurPageAhead | ShiftPg | MaxPageAhead (Binary Representation) / CurPage (MaxPage Shifted by ShiftPg) |
|---|---|---|---|---|
| > 90 | 64 | 64 | 0 | MaxPageAhead: 0 1 0 0 0 0 0 0<br>CurPage: 0 1 0 0 0 0 0 0 |
| > 80 | 64 | 32 | 1 | MaxPageAhead: 0 1 0 0 0 0 0 0<br>CurPage: 0 0 1 0 0 0 0 0 |
| > 70 | 64 | 16 | 2 | MaxPageAhead: 0 1 0 0 0 0 0 0<br>CurPage: 0 0 0 1 0 0 0 0 |
| > 60 | 64 | 8 | 3 | MaxPageAhead: 0 1 0 0 0 0 0 0<br>CurPage: 0 0 0 0 1 0 0 0 |
| > 50 | 64 | 4 | 4 | MaxPageAhead: 0 1 0 0 0 0 0 0<br>CurPage: 0 0 0 0 0 1 0 0 |
| > 40 | 64 | 2 | 5 | MaxPageAhead: 0 1 0 0 0 0 0 0<br>CurPage: 0 0 0 0 0 0 1 0 |
| < 40 | 64 | 1 (Off) | 6 | MaxPageAhead: 0 1 0 0 0 0 0 0<br>CurPage: 0 0 0 0 0 0 0 1 |

450

SYSTEM AND METHOD FOR DYNAMICALLY ADJUSTING READ AHEAD VALUES BASED UPON MEMORY USAGE

BACKGROUND OF THE INVENTION

1. Technical Field

The present invention relates in general to a system and method for adjusting operating system read ahead values based on memory usage. More particularly, the present invention relates to a system and method for monitoring virtual memory conditions and adjusting read ahead values associated with reading sequentially accessed files.

2. Description of the Related Art

Virtual memory is important in many modern, complex operating systems. Virtual memory is an imaginary memory area supported by some operating systems (for example, IBM's AIX™ operating system) in conjunction with the hardware. Virtual memory provides an alternate set of memory addresses. Programs use these virtual addresses rather than real addresses to store instructions and data. When the program is actually executed, the virtual addresses are converted into real memory addresses.

The purpose of virtual memory is to enlarge the address space, the set of addresses a program can utilize. For example, virtual memory might contain twice as many addresses as main memory. A program using all of virtual memory, therefore, would not be able to fit in main memory all at once. Nevertheless, the computer could execute such a program by copying into main memory those portions of the program needed at any given point during execution.

To facilitate copying virtual memory into real memory, the operating system divides virtual memory into pages, each of which contains a fixed number of addresses. Each page is stored on a disk until it is needed. When the page is needed, the operating system copies it from disk to main memory, translating the virtual addresses into real addresses.

In AIX™, virtual memory segments are partitioned into 4K (4096) byte units called pages and real memory is divided into 4K-byte page frames. The VMM manages the allocation of page frames as well as resolving references to virtual-memory pages that are not currently in RAM (stored in paging space) or do not yet exist. To accomplish these tasks, the VMM maintains a "free list" of available page frames and uses a page-replacement algorithm to determine which virtual-memory pages that are currently in RAM will have their page frames reassigned to the free list (i.e., swapped out). The page-replacement algorithm used by AIX's VMM takes into account the pages that are "persistent" verses those that are "working segments." As the name implies, persistent memory segments have permanent storage locations on disk. Data files or executable programs are typically mapped to persistent segments. On the other hand, working segments are transitory and exist only during their use by a program. Working segments have no permanent disk storage location. When working segments are paged out, they are written to disk paging space. When a program exits, all of the program's working pages are immediately placed back on the free list. Because working pages must be written back to disk before re-using its page frames, it is usually preferable to swap out persistent memory segments before swapping working memory segments.

Modern operating systems, such as IBM's AIX™ operating system, often use a Virtual Memory Manager (VMM) to manage the virtual memory in order to service memory requests from the operating system as well as memory requests received from applications. Many VMMs try to anticipate when a program is sequentially reading a file from disk in order to pre-fetch pages so that subsequent pages will already be loaded into memory before being requested by the program. This anticipation performed by the VMM is often referred to as "Sequential-Access Read Ahead."

In AIX™, the VMM tries to anticipate the future need for pages of a sequential file by detecting the pattern in which a program is accessing the file. When the program access two successive pages of a file, the VMM assumes that the program will continue to access the file sequentially. Consequently, the VMM schedules additional sequential reads of the file so that the file data is available to the program sooner than if the VMM waited to initiate the file I/O until the program requested the next page from the file.

In AIX™, Sequential-Access Read Ahead can be turned on/off as well as tuned using two VMM thresholds. First, minpgahead is set to the number of pages that are read ahead when the VMM first detects access of a sequential file. The second tuning threshold, maxpgahead, is set to the maximum number of pages the VMM will read ahead in a sequential file. When a sequential file is first detected, minpgahead pages are read. When subsequent requests are made for additional pages of the sequentially accessed file, the number of pages that are pre-fetched is increased until maxpgahead pages are pre-fetched.

FIG. 1 is a diagram showing a prior art implementation of Sequential-Access Read Ahead. VMM Sequential-Access Read Ahead processing commences at 100 whereupon, at step 120, a first access of file 110 causes the first page (page 0) of file 100 to be read. At this point the VMM makes no assumption about random or sequential file access. At step 130, the program accesses the first byte of the next page (page 1), with no intervening accesses to other pages of the file. At this point, VMM concludes that the program is accessing sequentially. It schedules a number of extra pages (e.g., two extra pages) corresponding to the current minpgahead value. In this example, two additional pages (pages 2 and 3) are read. Thus, in this example a total of 3 pages are read as a result of the program's second read request.

At step 140, the program accesses the first byte of the first page that has been read ahead (page 2), the VMM doubles the page-ahead value to 4 and schedules pages 4 through 7 to be read from file 110.

At step 150, the program accesses the first byte of the first page that has been read ahead (page 4), the VMM again doubles the page-ahead value to 8 and schedules pages 8 through 15 to be read. This doubling continues until the amount of data being read reaches maxpgahead or until the end of the file is reached.

At step 160, maxpgahead has been reached and the VMM continues reading maxpgahead pages when the program accesses the first byte of the previous group of read-ahead pages until the file ends.

As can be seen by the diagram shown in FIG. 1, having a high maxpgahead value improves efficiency and speed of programs performing large amounts of sequential-access reads. A challenge, however, of pre-fetching large numbers of sequentially-accessed pages is that memory can sometimes become constrained. When memory becomes constrained, the VMM determines which virtual-memory pages that are currently in RAM will have their page frames reassigned to the free list. In the case of persistent memory segments, identified pages can be reassigned quickly. However, if working memory segments need to be reassigned, the working memory segment data must first be written to disk paging space.

What is needed, therefore, is a system and method for identifying memory constraint conditions and dynamically adjusting the VMM's Sequential-Access Read Ahead threshold values accordingly. Furthermore, what is needed is a system and method that automatically turns off the VMM's Sequential-Access Read Ahead when memory is highly constrained and turns the Sequential-Access Read Ahead in a manner that reduces the number of times the Sequential-Access Read Ahead is toggled between on and off states.

SUMMARY

It has been discovered that the aforementioned challenges are resolved by dynamically altering VMM Sequential-Access Read Ahead settings based upon current system memory conditions. In one embodiment, normal VMM operations are performed using the Sequential-Access Read Ahead values set by the user. When low free space is detected in the system's free list, the system either turns off Sequential-Access Read Ahead operations or decreases the maximum page ahead (maxpgahead) value based upon whether the amount of free space is simply low or has reached a critically low level (Sequential-Access Read Ahead turned off when memory critically low and maxpgahead decreased when memory low but not critically low). The altered VMM Sequential-Access Read Ahead state remains in effect until enough free space is available so that normal VMM Sequential-Access Read Ahead operations can be performed (at which point the altered Sequential-Access Read Ahead values are reset to their original levels).

In another embodiment, Sequential-Access Read Ahead values are dynamically set based upon a threshold value using an algorithm that decreases and increases the maxpgahead value. In addition, sudden extreme drops in available pages result in Sequential-Access Read Ahead being turned off. The current maxpgahead setting (CurPgAhead) is calculated by an algorithm that takes account of the difference between the minimum free pages (minfree) setting and the space available in the free list as well as the difference between minfree and the low free list threshold set by the operator. In this manner, the operator can adjust the minfree and threshold settings based upon the operations being performed on the computer system.

In one embodiment, when Sequential-Access Read Ahead is turned off, it is not turned back on until the amount of free space rises above the maxpgahead that was in effect when the sudden drop was detected. In this manner, Sequential-Access Read Ahead is less likely to oscillate between ON and OFF states which may hinder system performance.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 4 is a diagram showing a table of sample Sequential-Access Read Ahead thresholds being dynamically altered using the logic shown in FIG. 3.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
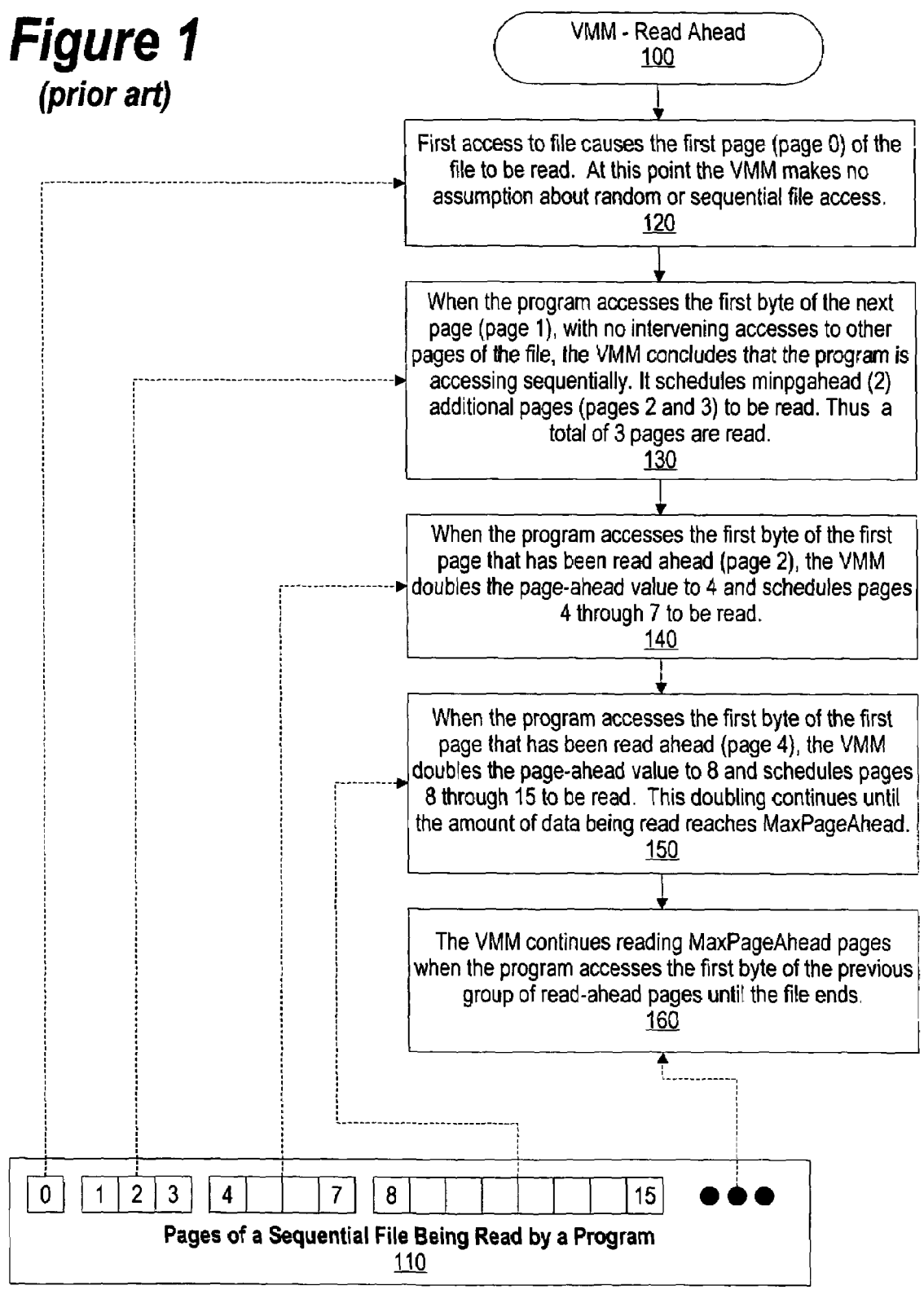
FIG. 1 is a diagram showing a prior-art implementation of a VMM Sequential-Access Read Ahead function.

FIG. 1 is a diagram showing a prior-art implementation of a VMM Sequential-Access Read Ahead function. Details regarding FIG. 1 are provided in the Background section, above.

Figure 2:
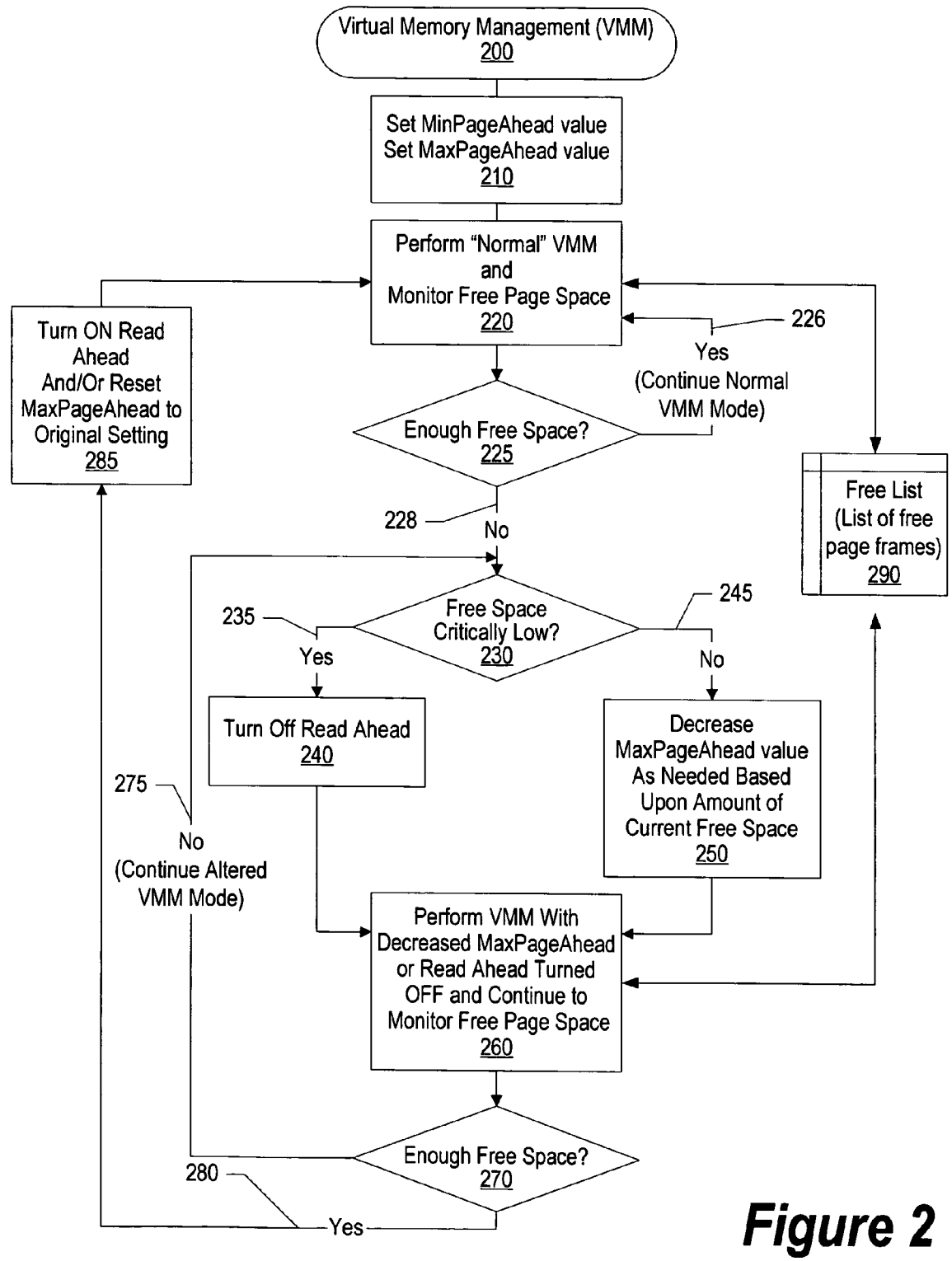
FIG. 2 is a flowchart showing one implementation of altering VMM Sequential-Access Read Ahead threshold values.

FIG. 2 is a flowchart showing one implementation of altering VMM Sequential-Access Read Ahead threshold values. Processing commences at 200 whereupon, at step 210, the minimum and maximum page ahead values (minpgahead and maxpgahead) are set. The minpgahead setting determines the minimum number of pages retrieved by the VMM's Sequential-Access Read Ahead process. Conversely, the maxpgahead setting determines the maximum number of pages retrieved by the VMM's Sequential-Access Read Ahead process. As was described in the Background section, the VMM's Sequential-Access Read Ahead uses the minpgahead and maxpgahead settings to pre-fetch pages of a file that is being sequentially accessed.

At step 220, "normal" VMM Sequential-Access Read Ahead operations are performed while monitoring the amount of free page space (number of pages noted as available in freelist 290). A more detailed description of normal VMM Sequential-Access Read Ahead operations is provided in the Background section, above. The amount of free memory space (free pages) available in the system's memory is monitored by the system to ensure that there is enough free space to satisfy memory requests. A determination is made as to whether enough free space is available (decision 225). If enough free space is available, decision 225 branches to "yes" branch 226 and normal VMM Sequential-Access Read Ahead operations continue. However, if free space is constrained, decision 225 branches to "no" branch 228 in order to address the low free space condition.

A determination is made as to whether the low free space condition has reached a critically low level (decision 230). If the amount of free space is at a critically low level, decision 230 branches to "yes" 235 whereupon, at step 240, the VMM's Sequential-Access Read Ahead is turned OFF. On the other hand, if the amount of free space is low, but not critically low, then decision 230 branches to "no" branch 245 whereupon, at step 250, the maximum number of pages retrieved by the VMM's Sequential-Access Read Ahead process (maxpgahead) is decreased. In one embodiment, maxpgahead is decreased by an amount that is based upon the amount of free space. In other words, when more free space is available then maxpgahead is reduced by a smaller amount than when less free space is available.

At step 250, VMM operations continue using the altered settings provided in steps 240 or 250. If Sequential-Access Read Ahead was turned OFF, then VMM continues operation without performing Sequential-Access Read Ahead operations. On the other hand, if maxpgahead was decreased, then the VMM's Sequential-Access Read Ahead operation continues to provide read-ahead services but using a smaller maximum number of read-ahead pages. In this manner, either no pages or fewer pages are used for Sequential-Access Read Ahead services. Periodically, the amount of free memory space available in the system's memory is retrieved and a determination is made as to whether enough free space is available (decision 270). If memory is still constrained, decision 270 branches to "no" branch 275 whereupon processing loops back to determine whether memory is critically low and sets Sequential-Access Read Ahead settings accordingly. On the other hand, if there is enough free space (i.e., memory is no longer constrained), decision 270 branches to "yes" branch 280 whereupon, at step 285, the VMM's Sequential-Access Read Ahead is turned ON (if it had been turned off) and the Sequential-Access Read Ahead's maxpgahead value is reset to its original value. Processing continues to dynamically adjust the VMM's Sequential-Access Read Ahead settings based upon the amount of memory currently available in the system.

Figure 3:
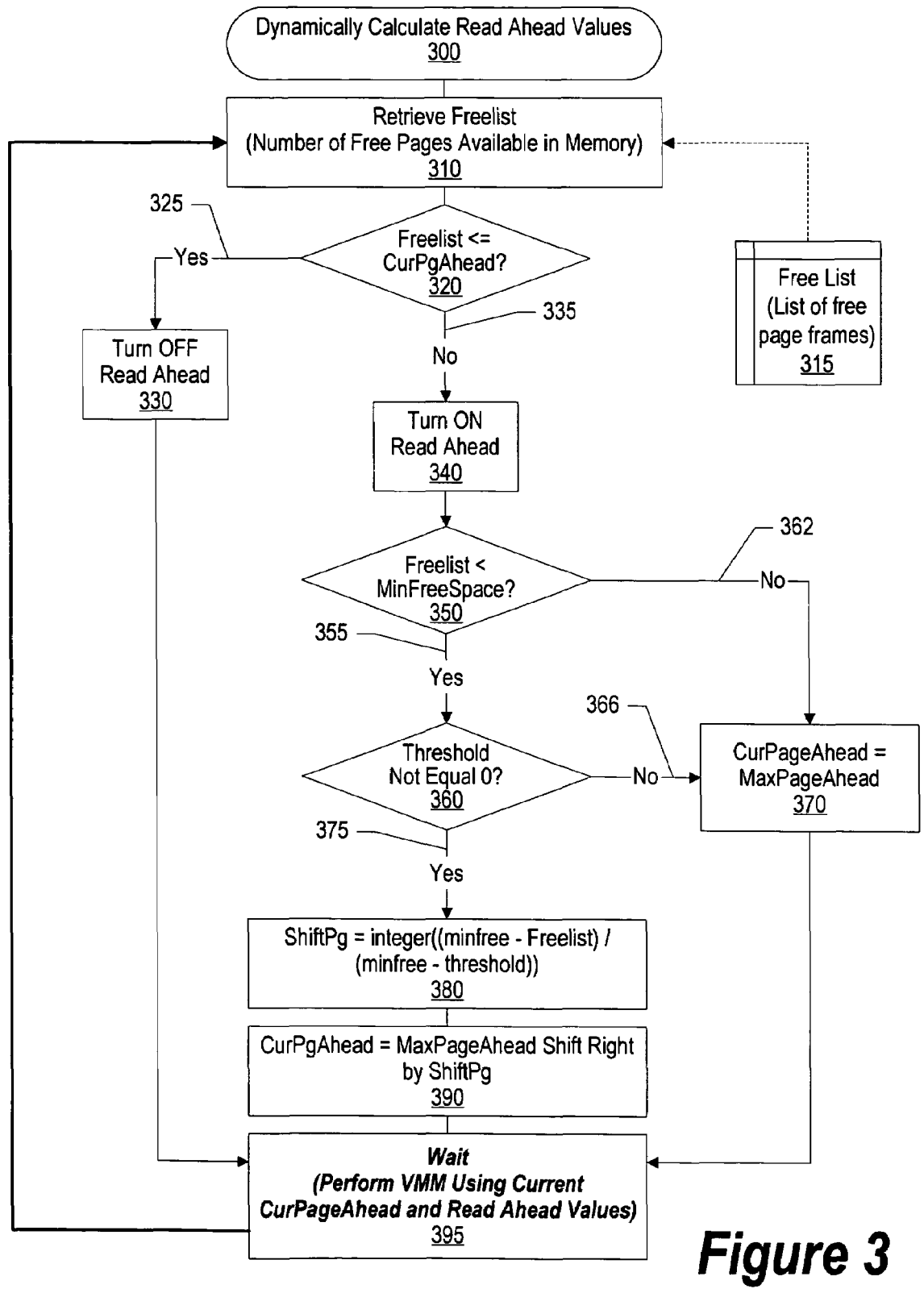
FIG. 3 is a flowchart showing a second implementation of dynamically altering VMM Sequential-Access Read Ahead threshold values.

FIG. 3 is a flowchart showing a second implementation of dynamically altering VMM Sequential-Access Read Ahead threshold values. Processing commences at 300 whereupon, at step 310, the amount of free page frames is retrieved from freelist 315. In this embodiment, the VMM's current maximum Sequential-Access Read Ahead value is noted as "CurPgAhead" (Current Maximum Page Ahead) so that the Maximum Page Ahead (maxpgahead) value set by the user/operator is not changed. When initialized, CurPgAhead is set equal to maxpgahead.

A determination is made as to whether the number of free pages currently available in the free list is less than or equal to the current maximum pages (CurPgAhead) value (decision 320). If the current number of free pages is less than or equal to the current maximum read-ahead pages, then decision 320 branches to "yes" branch 325 whereupon, at step 330, the VMM's Sequential-Access Read Ahead is turned OFF in order to address the critical memory constraint. On the other hand, if the current number of free pages is greater than the current maximum read-ahead pages, then decision 320 branches to "no" branch 335 whereupon, at step 340 the VMM's Sequential-Access Read Ahead operation is turned ON. Note that the VMM's Sequential-Access Read Ahead process can either be OFF or ON before entering decision 320 based upon the memory conditions present during the previous memory analysis.

When the VMM's Sequential-Access Read Ahead operation is ON, a determination is made as to whether a low memory condition exists (decision 350). Decision 350 is based upon whether the current number of free pages is less than the VMM's minimum desired free space (minfree) setting. If memory is constrained (i.e., current free space<minimum desired free space), then decision 350 branches to "yes" 355 to address the low memory condition. On the other hand, if memory is not constrained, decision 350 branches to "no" branch 362 whereupon, at step 370, the current maximum page-ahead value (CurPgAhead) is set to be equal to the maxpgahead value set by the user/operator.

Returning to decision 350, if memory is constrained and decision 350 branches to "yes" branch 355, then another determination is made as to whether the threshold set by the user has been set to zero (i.e., disabling dynamic altering of the maxpgahead value). If dynamic altering of maxpgahead has been disabled, decision 360 branches to "no" 366 whereupon, at step 370, the current maximum page-ahead value (CurPgAhead) is set to be equal to the maxpgahead value set by the user/operator. On the other hand, if dynamic altering of Sequential-Access Read Ahead values has been enabled, then decision 360 branches to "yes" 375 to dynamically alter the maximum read-ahead value based upon the current memory conditions.

Dynamic alteration of the maximum read-ahead value begins at step 380 where a shift pages (ShiftPg) value is calculated by the equation:

$$ShiftPg = \text{integer}\left(\frac{(minfree - freelist)}{(minfree - threshold)}\right)$$

where minfree is the minimum desired number of free pages, freelist is the current number of free pages, and threshold is the low memory threshold at which dynamic alteration of the maximum Sequential-Access Read Ahead value begins. At step 390, the current maximum page ahead (CurPgAhead) is set to be equal to the maxpgahead shifted by the number of bits resulting from the ShiftPg algorithm described above. In this embodiment, maxpgahead remains constant and CurPgAhead is the dynamic maximum page ahead value that is used by the VMM's Sequential-Access Read Ahead process (e.g., the Sequential-Access Read Ahead operation shown in FIG. 1 would use the CurPgAhead setting to determine the maximum number of pages to pre-fetch rather than the maxpgahead value). FIG. 4, described in detail below, shows a table detailing the current effective maximum page ahead value (CurPgAhead) based upon a threshold value, a minimum desired free space value (MinFree), and a maximum page ahead (maxpgahead) value.

At step 395, the VMM's Sequential-Access Read Ahead process is performed using the current maximum page ahead (CurPgAhead) setting and read ahead values set in the preceding steps. Periodically (i.e., on a time-based interval), processing loops back to retrieve the current freelist and re-adjust the CurPgAhead setting and other Sequential-Access Read Ahead settings as needed.

FIG. 4 is a diagram showing a table of sample Sequential-Access Read Ahead thresholds being dynamically altered using the logic shown in FIG. 3. In the example shown in FIG. 4, the minimum desired free space (minfree) has been set to 100 pages, the threshold has been set to 90 (i.e., 90% of minfree), and the maximum Sequential-Access Read Ahead value (maxpgahead) has been set to 64.

Table 450 has been completed using the algorithm set forth in FIG. 3, with minfree, threshold, and maxpgahead remaining constant at 100, 90, and 64, respectively:

$$ShiftPg = \text{integer}\left(\frac{(minfree - freelist)}{(minfree - threshold)}\right)$$

When the number of free pages is above 90, the resulting ShiftPg value is 0. Applying the shift value (0) to maxpgahead (64) results in CurPgAhead being the same as maxpgahead (64). When the number of free pages is less than or equal to 90 but greater than 80, the resulting ShiftPg value is 1. Shifting maxpgahead (64) right one place results in CurPgAhead being 32.

When the number of free pages is less than or equal to 80 but greater than 70, the resulting ShiftPg value is 2. Shifting maxpgahead (64) right two places results in CurPgAhead being 16. When the number of free pages is less than or equal to 70 but greater than 60, the resulting ShiftPg value is 3. Shifting maxpgahead (64) right three places results in CurPgAhead being 8. When the number of free pages is less than or equal to 60 but greater than 50, the resulting ShiftPg value is 4. Shifting maxpgahead (64) right four places results in CurPgAhead being 4.

When the number of free pages is less than or equal to 50 but greater than 40, the resulting ShiftPg value is 5. Shifting maxpgahead (64) right five places results in CurPgAhead being 2. Finally, when the number of free pages is less than or equal to 40, the resulting ShiftPg value is 6. Shifting maxpgahead (64) right six places results in CurPgAhead being one (i.e., turned off)

Figure 5:
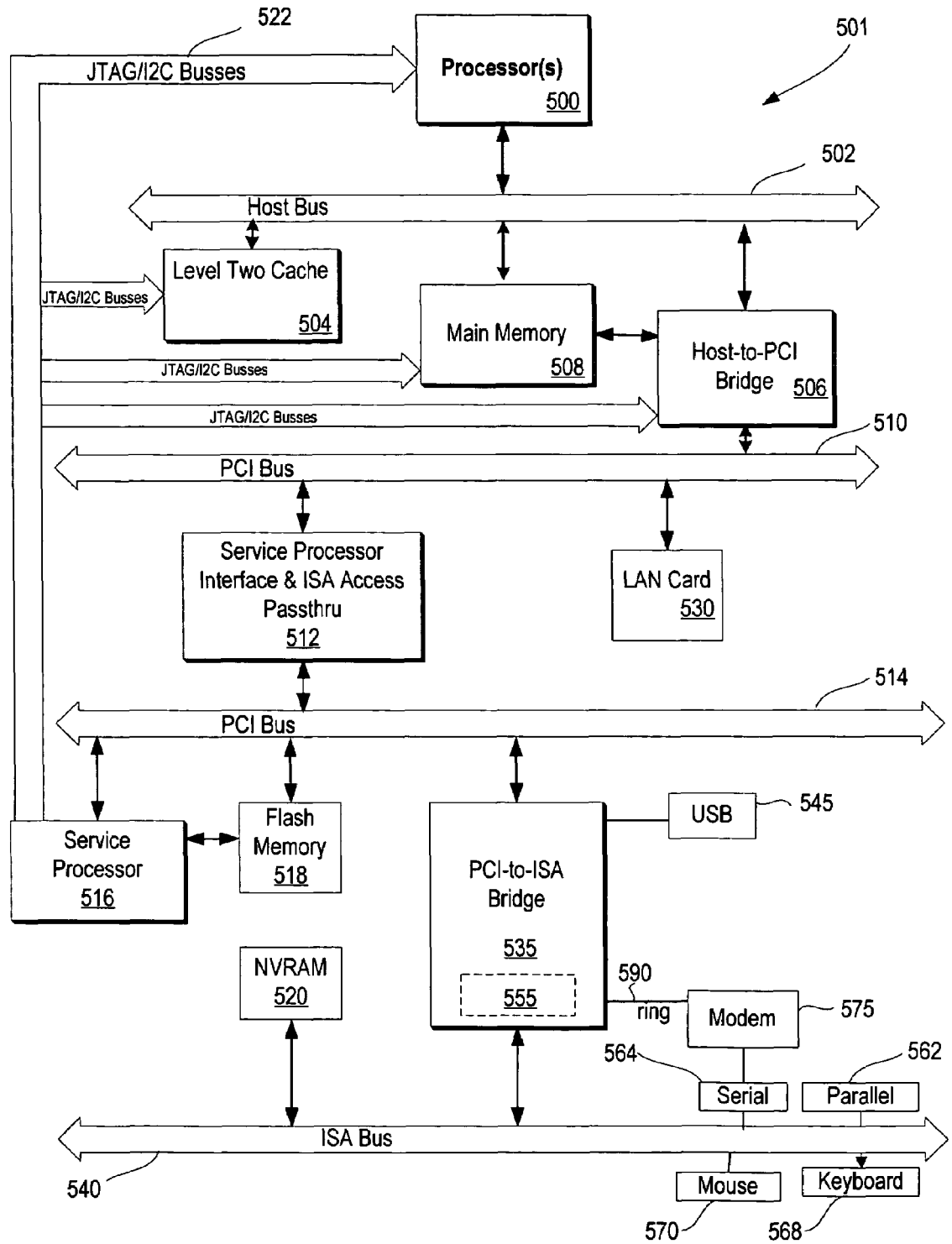
FIG. 5 is a block diagram of an information handling system capable of implementing the present invention.

FIG. 5 illustrates information handling system 501 which is a simplified example of a computer system capable of performing the computing operations described herein. Computer system 501 includes processor 500 which is coupled to host bus 502. A level two (L2) cache memory 504 is also coupled to host bus 502. Host-to-PCI bridge 506 is coupled to main memory 508, includes cache memory and main memory control functions, and provides bus control to handle transfers among PCI bus 510, processor 500, L2 cache 504, main memory 508, and host bus 502. Main memory 508 is coupled to Host-to-PCI bridge 506 as well as host bus 502. Devices used solely by host processor(s) 500, such as LAN card 530, are coupled to PCI bus 510. Service Processor Interface and ISA Access Pass-through 512 provides an interface between PCI bus 510 and PCI bus 514. In this manner, PCI bus 514 is insulated from PCI bus 510. Devices, such as flash memory 518, are coupled to PCI bus 514. In one implementation, flash memory 518 includes BIOS code that incorporates the necessary processor executable code for a variety of low-level system functions and system boot functions.

PCI bus 514 provides an interface for a variety of devices that are shared by host processor(s) 500 and Service Processor 516 including, for example, flash memory 518. PCI-to-ISA bridge 535 provides bus control to handle transfers between PCI bus 514 and ISA bus 540, universal serial bus (USB) functionality 545, power management functionality 555, and can include other functional elements not shown, such as a real-time clock (RTC), DMA control, interrupt support, and system management bus support. Nonvolatile RAM 520 is attached to ISA Bus 540. Service Processor 516 includes JTAG and I2C busses 522 for communication with processor(s) 500 during initialization steps. JTAG/I2C busses 522 are also coupled to L2 cache 504, Host-to-PCI bridge 506, and main memory 508 providing a communications path between the processor, the Service Processor, the L2 cache, the Host-to-PCI bridge, and the main memory. Service Processor 516 also has access to system power resources for powering down information handling device 501.

Peripheral devices and input/output (I/O) devices can be attached to various interfaces (e.g., parallel interface 562, serial interface 564, keyboard interface 568, and mouse interface 570 coupled to ISA bus 540. Alternatively, many I/O devices can be accommodated by a super I/O controller (not shown) attached to ISA bus 540.

In order to attach computer system 501 to another computer system to copy files over a network, LAN card 530 is coupled to PCI bus 510. Similarly, to connect computer system 501 to an ISP to connect to the Internet using a telephone line connection, modem 575 is connected to serial port 564 and PCI-to-ISA Bridge 535.

While the computer system described in FIG. 5 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method comprising:
   detecting that a memory being managed by a virtual memory manager is constrained;
   dynamically altering settings used by a sequential access read ahead process in response to the detection, wherein the altered settings are adapted to conserve memory used by the sequential access read ahead process, and wherein the altering includes decreasing a maximum page ahead value, wherein the maximum page ahead value corresponds to a maximum number of pages read by the sequential access read ahead process;
   executing the virtual memory manager for a time interval after decreasing the maximum page ahead value;
   determining that the memory is less constrained after the time interval has elapsed; and increasing the maximum page ahead value in response to the determination.

2. The method of claim 1 further comprising:
retrieving a value corresponding to a number of free page frames currently being managed by the virtual memory manager; and
calculating a difference between the number of free page frames value and a minimum desired free page constant, wherein the maximum page ahead value is decreased by an amount based on the calculated difference.

3. The method of claim 1 wherein the altering further comprises:
disabling the sequential access read ahead process.

4. The method of claim 3 further comprising:
enabling the sequential access read ahead process in response to the determination.

5. A computer-implemented method of managing memory pages, wherein the memory includes a number of used pages and a number of free pages, said method comprising:
retrieving a freelist value corresponding to the current number of free pages;
determining that the freelist value is less than a predetermined minimum value;
dynamically altering settings used by a sequential access read ahead process in response to the detection, wherein the altered settings are adapted to decrease the allocation of free pages to the sequential access read ahead process, and wherein the altering includes decreasing a current maximum page ahead value, wherein the current maximum page ahead value corresponds to a maximum number of pages read by the sequential access read ahead process, and wherein the decreasing further includes:
calculating a shift value based on the difference between the freelist value and the predetermined minimum value; and
bit shifting a constant maximum page ahead value by the shift value, the bit shifting resulting in the current maximum page ahead value.

6. The method of claim 5 wherein the calculating further comprises:
dividing the difference between the freelist value and the predetermined minimum value by the difference between the predetermined minimum value and a predetermined adjustment threshold, the dividing resulting in a quotient and a remainder; and
setting the shift value to the quotient.

7. The method of claim 5 further comprising:
executing a virtual memory manager for a time interval following the decreasing, wherein the virtual memory manager manages the memory pages and wherein the virtual memory manager includes the sequential access read ahead process;
retrieving a subsequent freelist value corresponding to the number of free pages available after the time interval;
comparing the subsequent freelist value with the current maximum page ahead value; and
disabling the sequential access read ahead process in response to the comparison.

8. The method of claim 5 further comprising:
executing a virtual memory manager for a time interval following the decreasing, wherein the virtual memory manager manages the memory pages and wherein the virtual memory manager includes the sequential access read ahead process;
retrieving a subsequent freelist value corresponding to the number of free pages available after the time interval;
determining that the subsequent freelist value is less than the predetermined minimum value;
calculating a second shift value based on the difference between the subsequent freelist value and the predetermined minimum value; and
bit shifting the constant maximum page ahead value by the second shift value, the bit shifting resulting in the current maximum page ahead value.

9. The method of claim 5 further comprising:
executing a virtual memory manager for a time interval following the decreasing, wherein the virtual memory manager manages the memory pages and wherein the virtual memory manager includes the sequential access read ahead process;
retrieving a subsequent freelist value corresponding to the number of free pages available after the time interval;
determining that the subsequent freelist value is greater than the predetermined minimum value; and
setting the current maximum read ahead value equal to the constant maximum page ahead value in response to the determination.

10. The method of claim 5 wherein the altering further comprises:
disabling the sequential access read ahead process.

11. An information handling system comprising:
one or more processors;
a memory accessible by the processors;
an operating system that controls the processors;
a virtual memory manager, included with the operating system, that manages use of the memory;
a nonvolatile storage area managed by the operating system and including a disk swap area used by the virtual memory manager;
a sequential access read ahead process performed by the operating system adapted to pre-fetch data being sequentially read from file stored in the nonvolatile storage area;
memory conservation software used by the virtual memory manager, the software effective to:
detect that a memory being managed by a virtual memory manager is constrained;
dynamically alter settings used by the sequential access read ahead process in response to the detection, wherein the altered settings are adapted to conserve memory used by the sequential access read ahead process, and wherein the software is further effective to decrease a maximum page ahead value, wherein the maximum page ahead value corresponds to a maximum number of pages read by the sequential access read ahead process;
execute the virtual memory manager for a time interval after decreasing the maximum page ahead value;
determine that the memory is less constrained after the time interval has elapsed; and
increase the maximum page ahead value in response to the determination.

12. The information handling system of claim 11 wherein the software is further effective to:
retrieve a value corresponding to a number of free page frames currently being managed by the virtual memory manager; and
calculate a difference between the number of free page frames value and a minimum desired free page constant, wherein the maximum page ahead value is decreased by an amount based on the calculated difference.

13. The information handling system of claim 11 wherein the software is further effective to:
   disable the sequential access read ahead process.

14. The information handling system of claim 13 wherein the software is further effective to:
   enable the sequential access read ahead process in response to the determination.

15. An information handling system comprising:
   one or more processors;
   a memory accessible by the processors;
   an operating system that controls the processors;
   a virtual memory manager, included with the operating system, that manages use of the memory;
   a nonvolatile storage area managed by the operating system and including a disk swap area used by the virtual memory manager;
   a sequential access read ahead process performed by the operating system adapted to pre-fetch data being sequentially read from file stored in the nonvolatile storage area;
   memory conservation software used by the virtual memory manager, the software effective to:
      retrieve a freelist value corresponding to the current number of free pages;
      determine that the freelist value is less than a predetermined minimum value;
      dynamically alter settings used by a sequential access read ahead process in response to the detection, wherein the altered settings are adapted to decrease the allocation of free pages to the sequential access read ahead process, and wherein the altering includes decreasing a current maximum page ahead value, wherein the current maximum page ahead value corresponds to a maximum number of pages read by the sequential access read ahead process, wherein the decreasing includes:
         calculating a shift value based on the difference between the freelist value and the predetermined minimum value; and
         bit shifting a constant maximum page ahead value by the shift value, the bit shifting resulting in the current maximum page ahead value.

16. The information handling system of claim 15 wherein the calculating further comprises:
   dividing the difference between the freelist value and the predetermined minimum value by the difference between the predetermined minimum value and a predetermined adjustment threshold, the dividing resulting in a quotient and a remainder; and
   setting the shift value to the quotient.

17. The information handling system of claim 15 further comprising:
   executing a virtual memory manager for a time interval following the decreasing, wherein the virtual memory manager manages the memory pages and wherein the virtual memory manager includes the sequential access read ahead process;
   retrieving a subsequent freelist value corresponding to the number of free pages available after the time interval;
   comparing the subsequent freelist value with the current maximum page ahead value; and
   disabling the sequential access read ahead process in response to the comparison.

18. The information handling system of claim 15 further comprising:
   executing a virtual memory manager for a time interval following the decreasing, wherein the virtual memory manager manages the memory pages and wherein the virtual memory manager includes the sequential access read ahead process;
   retrieving a subsequent freelist value corresponding to the number of free pages available after the time interval;
   determining that the subsequent freelist value is less than the predetermined minimum value;
   calculating a second shift value based on the difference between the subsequent freelist value and the predetermined minimum value; and
   bit shifting the constant maximum page ahead value by the second shift value, the bit shifting resulting in the current maximum page ahead value.

19. The information handling system of claim 15 further comprising:
   executing a virtual memory manager for a time interval following the decreasing, wherein the virtual memory manager manages the memory pages and wherein the virtual memory manager includes the sequential access read ahead process;
   retrieving a subsequent freelist value corresponding to the number of free pages available after the time interval;
   determining that the subsequent freelist value is greater than the predetermined minimum value; and
   setting the current maximum read ahead value equal to the constant maximum page ahead value in response to the determination.

20. The method of claim 19 wherein the altering further comprises:
   disabling the sequential access read ahead process.

21. A computer program product stored on a computer operable media, said computer program product comprising:
   means for detecting that a memory being managed by a virtual memory manager is constrained;
   means for dynamically altering settings used by a sequential access read ahead process in response to the detection, wherein the altered settings are adapted to conserve memory used by the sequential access read ahead process, and wherein the means for altering includes means for decreasing a maximum page ahead value, wherein the maximum page ahead value corresponds to a maximum number of pages read by the sequential access read ahead process;
   means for executing the virtual memory manager for a time interval after decreasing the maximum page ahead value;
   means for determining that the memory is less constrained after the time interval has elapsed; and
   means for increasing the maximum page ahead value in response to the determination.

22. The computer program product of claim 21 further comprising:
   means for retrieving a value corresponding to a number of free page frames currently being managed by the virtual memory manager; and
   means for calculating a difference between the number of free page frames value and a minimum desired free page constant, wherein the maximum page ahead value is decreased by an amount based on the calculated difference.

23. The computer program product of claim 21 wherein the means for altering further comprises:

means for disabling the sequential access read ahead process.

24. The computer program product of claim 23 further comprising:
means for enabling the sequential access read ahead process in response to the determination.

25. A computer-implemented computer program product for managing memory pages, wherein the memory includes a number of used pages and a number of free pages, said computer program product comprising:
means for retrieving a freelist value corresponding to the current number of free pages;
means for determining that the freelist value is less than a predetermined minimum value;
means for dynamically altering settings used by a sequential access read ahead process in response to the detection, wherein the altered settings are adapted to decrease the allocation of free pages to the sequential access read ahead process, and wherein the means for altering includes means for decreasing a current maximum page ahead value, wherein the current maximum page ahead value corresponds to a maximum number of pages read by the sequential access read ahead process, and wherein the means for decreasing includes:
means for calculating a shift value based on the difference between the freelist value and the predetermined minimum value; and
means for bit shifting a constant maximum page ahead value by the shift value, the bit shifting resulting in the current maximum page ahead value.

26. The computer program product of claim 25 wherein the means for calculating further comprises:
means for dividing the difference between the freelist value and the predetermined minimum value by the difference between the predetermined minimum value and a predetermined adjustment threshold, the dividing resulting in a quotient and a remainder; and
means for setting the shift value to the quotient.

27. The computer program product of claim 25 further comprising:
means for executing a virtual memory manager for a time interval following the execution of the means for decreasing, wherein the virtual memory manager manages the memory pages and wherein the virtual memory manager includes the sequential access read ahead process;
means for retrieving a subsequent freelist value corresponding to the number of free pages available after the time interval;
means for comparing the subsequent freelist value with the current maximum page ahead value; and
means for disabling the sequential access read ahead process in response to the comparison.

28. The computer program product of claim 25 further comprising:
means for executing a virtual memory manager for a time interval following the execution of the means for decreasing, wherein the virtual memory manager manages the memory pages and wherein the virtual memory manager includes the sequential access read ahead process;
means for retrieving a subsequent freelist value corresponding to the number of free pages available after the time interval;
means for determining that the subsequent freelist value is less than the predetermined minimum value;
means for calculating a second shift value based on the difference between the subsequent freelist value and the predetermined minimum value; and
means for bit shifting the constant maximum page ahead value by the second shift value, the bit shifting resulting in the current maximum page ahead value.

29. The computer program product of claim 25 further comprising:
means for executing a virtual memory manager for a time interval following the decreasing, wherein the virtual memory manager manages the memory pages and wherein the virtual memory manager includes the sequential access read ahead process;
means for retrieving a subsequent freelist value corresponding to the number of free pages available after the time interval;
means for determining that the subsequent freelist value is greater than the predetermined minimum value; and
means for setting the current maximum read ahead value equal to the constant maximum page ahead value in response to the determination.

30. The computer program product of claim 25 wherein the means for altering further comprises:
means for disabling the sequential access read ahead process.

* * * * *